(12) United States Patent
Ryskamp et al.

(10) Patent No.: US 12,393,395 B1
(45) Date of Patent: Aug. 19, 2025

(54) CONTROLLING AUDIO BASED ON HEAD POSITION AND POSE

(71) Applicant: Zoom Video Communications, Inc., San Jose, CA (US)

(72) Inventors: Robert Allen Ryskamp, Mountain View, CA (US); Adam Justin Spooner, Greensboro, NC (US)

(73) Assignee: Zoom Communications, Inc., San Jose, CA (US)

( * ) Notice: Subject to any disclaimer, the term of this patent is extended or adjusted under 35 U.S.C. 154(b) by 286 days.

(21) Appl. No.: 18/143,449

(22) Filed: May 4, 2023

Related U.S. Application Data

(63) Continuation of application No. 17/876,712, filed on Jul. 29, 2022, now abandoned.

(51) Int. Cl.
*G06F 3/16* (2006.01)
*G06F 3/01* (2006.01)
*H04L 12/18* (2006.01)

(52) U.S. Cl.
CPC .............. *G06F 3/165* (2013.01); *G06F 3/012* (2013.01); *G06F 3/013* (2013.01); *H04L 12/1822* (2013.01)

(58) Field of Classification Search
CPC ........... G06F 3/165; G06F 3/012; G06F 3/013
See application file for complete search history.

(56) References Cited

U.S. PATENT DOCUMENTS

| | | | |
|---|---|---|---|
| 10,402,151 B2 * | 9/2019 | Pance | H04N 21/4223 |
| 10,708,706 B1 * | 7/2020 | Brimijoin, II | G06F 3/013 |
| 11,257,511 B1 * | 2/2022 | Peeler | G10L 25/57 |
| 2015/0055808 A1 * | 2/2015 | Vennstrom | G06F 3/012 |
| | | | 381/307 |
| 2020/0134295 A1 * | 4/2020 | el Kaliouby | G06V 10/82 |

* cited by examiner

*Primary Examiner* — David L Ton
(74) *Attorney, Agent, or Firm* — Kilpatrick Townsend & Stockton, LLP

(57) ABSTRACT

One example method includes joining, from a client device, a virtual meeting hosted by a virtual meeting provider, the virtual meeting comprising a plurality of participants, displaying the virtual meeting on the display of the client device, receiving a head tracking signal from an head tracking sensor, the head tracking signal associated with a first user of the client device, determining, based at least in part on the head tracking signal, a location and a position of the of user's head in relation to the display on which the first user is focused, and varying the volume of a first audio stream of a plurality of audio streams associated with the virtual meeting based at least in part on the position of the user's head.

20 Claims, 10 Drawing Sheets

CONTROLLING AUDIO BASED ON HEAD POSITION AND POSE

PRIORITY APPLICATIONS

This application is a continuation of U.S. application Ser. No. 17/876,712, entitled "CONTROLLING AUDIO BASED ON HEAD POSITION AND POSE," filed Jul. 29, 2022. The entirety of which is incorporated by reference herein.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
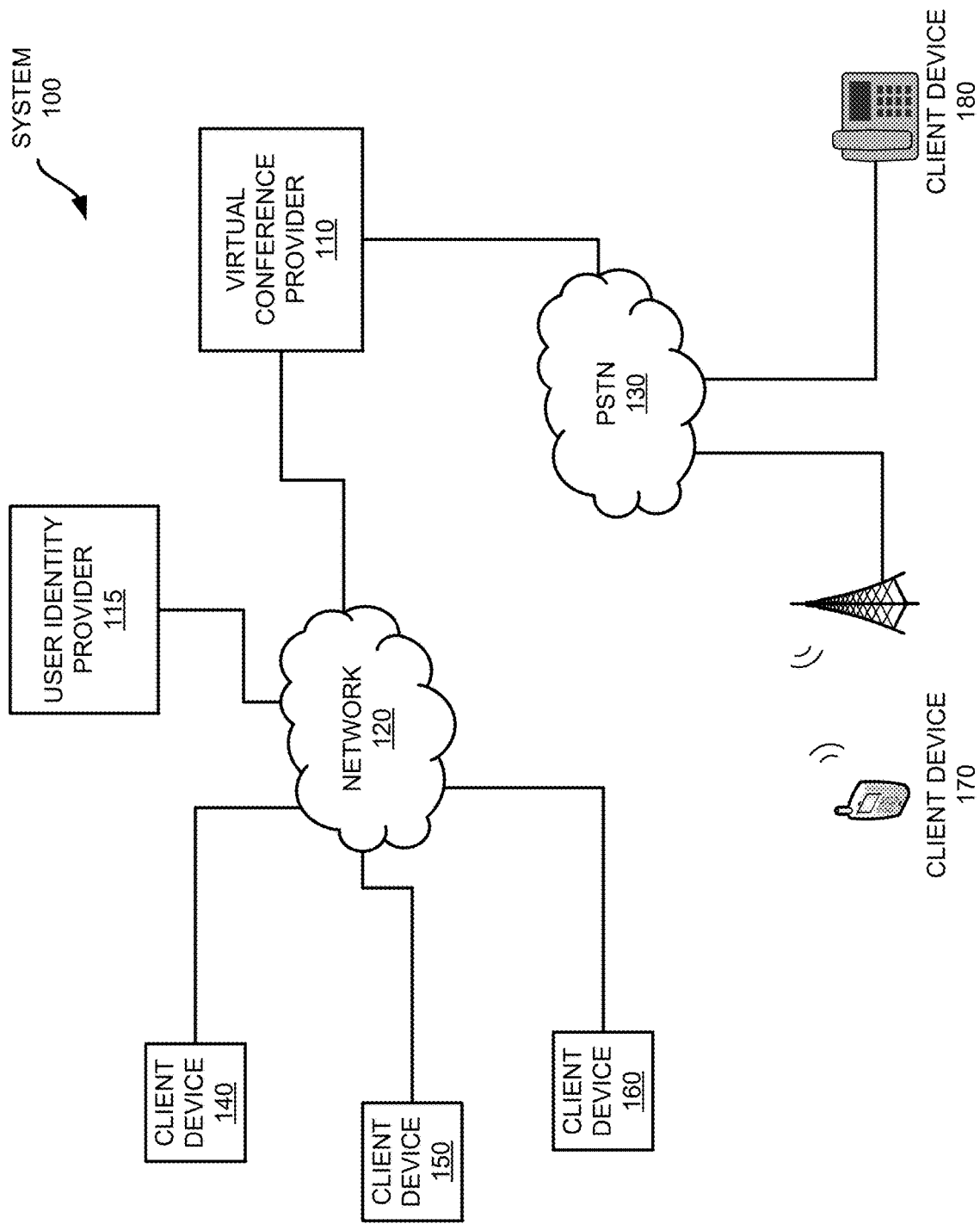
FIGS. 1-2 show example systems for audio focus in a virtual meeting based on eye tracking.

Examples are described herein in the context of audio focus in a virtual meeting based on head and eye tracking. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Virtual conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. In some of these larger meetings, the participants may be grouped together. For instance, in a group meeting or webinar, groups of participants may conduct conversations on various subtopics presented during the virtual meeting.

In such meetings, the client application may be capable of tracking the movement of a user's head and eyes to determine on what or whom the user is focusing. For instance, in a virtual meeting with a plurality of participants, each using their own client device and creating an audio stream, the user may focus on one particular speaker. By tracking the user's focus, the user's client application can, for instance, increase the volume of the audio stream for the speaker on whom the user is focused. And the user's client device may decrease the volume of the audio stream from other speakers, thus making it easier for the user to hear the speaker on which the user is focused. The amount of increase in volume may be based, at least in part, on the length of time that a user's focus remains on the speaker. In some examples, a speaker might be presenting a presentation on which the user is focused. The example system may relate the presentation and the speaker so that the user's focus on the presentation causes the volume associated with the speaker to increase. Such system may provide a visual indication of the user's focus on a speaker or object and may provide a visual indication of the volume or relative volume of particular participants. For instance, if a user focuses on a particular participant, the outline of the speaker or the speaker's window may be highlighted. In another example, a portion of a transcription that includes the particular audio stream that is increased might be highlighted.

Similar functionality may be provided in group meetings. For example, the user's client application may determine that the user is focused on a group of participants or an object, such as a conference table at which a group of participants is sitting. In such an example, each group may be captured by a single client device, and thus generate a single audio stream for the group. In other examples, the client device that the group is using may be capable of focusing the microphone on particular speakers within the group. In such an example, when the user's client device increases the volume of the audio stream associated with the group, the volume of the speaker within the group is louder than the other participants within the stream. In response, the client application can increase the volume of the audio stream of the group or the audio streams of each of the participants that make up the group. And because many groups may be speaking in the virtual meeting at once, leading to ambient sound or noise, the client application may decrease the volume of those other audio streams, making it easier for the user to hear and participate in the particular group on which the user is focused. In some group meetings, the client application may utilize information measuring how many participants in the event are focused on a particular speaker or object and increase the volume if the number exceeds a threshold. For example, if eighty percent (80%) of the participants in a video conference are focused on a particular group, the volume of the audio stream associated with that group may be increased for all participants in the video conference.

The client application may utilize various techniques for tracking the user's gaze or attention. For instance, the client application may track the user's eyes using a camera to determine the user's focus point on the display. In some examples, the user must focus on or about a particular point for a threshold period of time before the user's client application triggers the events in response to the user's focus. In other examples, if a user has focused on a particular speaker in excess of a certain percentage of time, then the system may maintain an increased volume on that particular speaker or group even when the user looks away briefly. By adjusting the threshold amount of time before activating or deactivating the focus process, the client application can avoid repeatedly increasing and decreasing the volume associated with various audio streams in a way that might be distracting. In another example, the client application may track the distance and angle of the user's head in relation to the surface of the display. In such an example, the system might increase the volume as the user move closer or leans in to a particular conversation and decrease the volume as the user moves further away. As another example, the client application may use the angle of the user's head to increase the volume on the side of the display towards which the user's head is turned or tilted.

In some examples, the virtual meeting may emulate a three-dimensional space, such as a theater. In such a virtual meeting, some participants may appear to be closer to or further away from the display screen. The client application can use this spatial relationship to vary the volume of particular audio streams or the balance between various output devices to cause the participant to sound as if they are in the location shown on the display.

These illustrative examples are given to introduce the reader to the general subject matter discussed herein and the disclosure is not limited to these examples. The following sections describe various additional non-limiting examples and examples of audio focus in a virtual meeting based on eye tracking.

Referring now to FIG. 1, FIG. 1 shows an example system 100 that provides videoconferencing functionality to various client devices. The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide video conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the virtual conference provider 110. In this example, the user identity provider 115 is operated by a different entity than the virtual conference provider 110, though in some examples, they may be the same entity.

Figure 2:
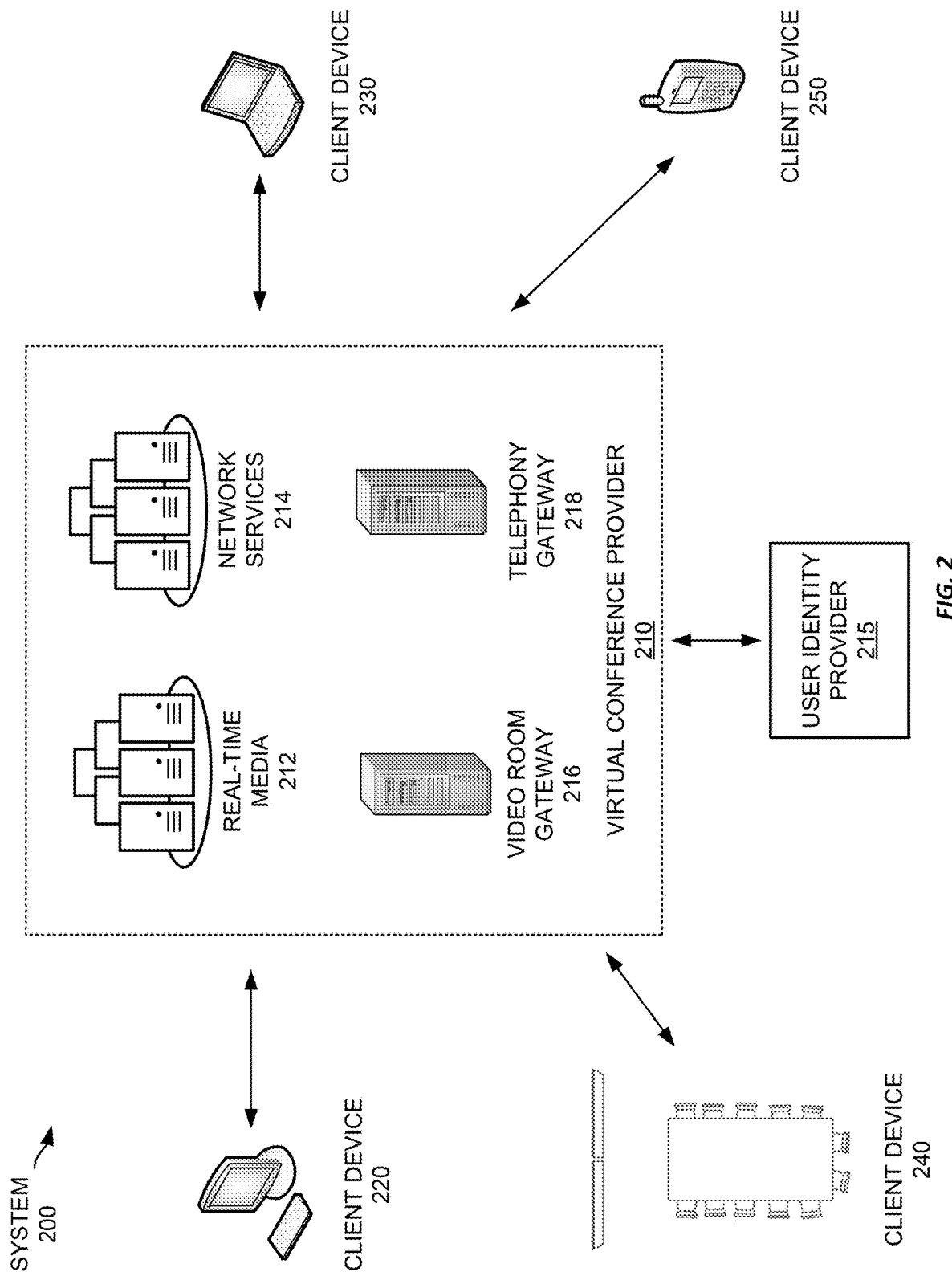

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the virtual conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, etc. After receiving the various meeting settings, the virtual conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the virtual conference provider 110. They also receive audio or video information from the virtual conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a virtual conference meeting hosted by the virtual conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively.

For telephony devices, e.g., client devices 170-180, the user may place a telephone call to the virtual conference provider 110 to access virtual conference services. After the call is answered, the user may provide information regarding a virtual conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the virtual conference provider 110.

Referring again to virtual conference provider 110, in some examples, it may allow client devices 140-160 to encrypt their respective video and audio streams to help improve privacy in their meetings. Encryption may be provided between the client devices 140-160 and the virtual conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted multimedia streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of virtual conference functionality, thereby enabling the various client devices to create and participate in virtual conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more virtual conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the virtual conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the virtual conference provider 210 may receive multimedia streams from the various participants and publish those streams to the various participants to subscribe to and receive. Thus, the virtual conference provider 210 notifies a client device, e.g., client device 220, about various multimedia streams available from the other client devices 230-250, and the client device 220 can select which multimedia stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted multimedia streams at the virtual conference provider 210, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the virtual conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the virtual conference provider 210 under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 214 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider 210 allows for anonymous users. For example, an anonymous user may access the virtual conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting, or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the virtual conference provider 210 to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3:
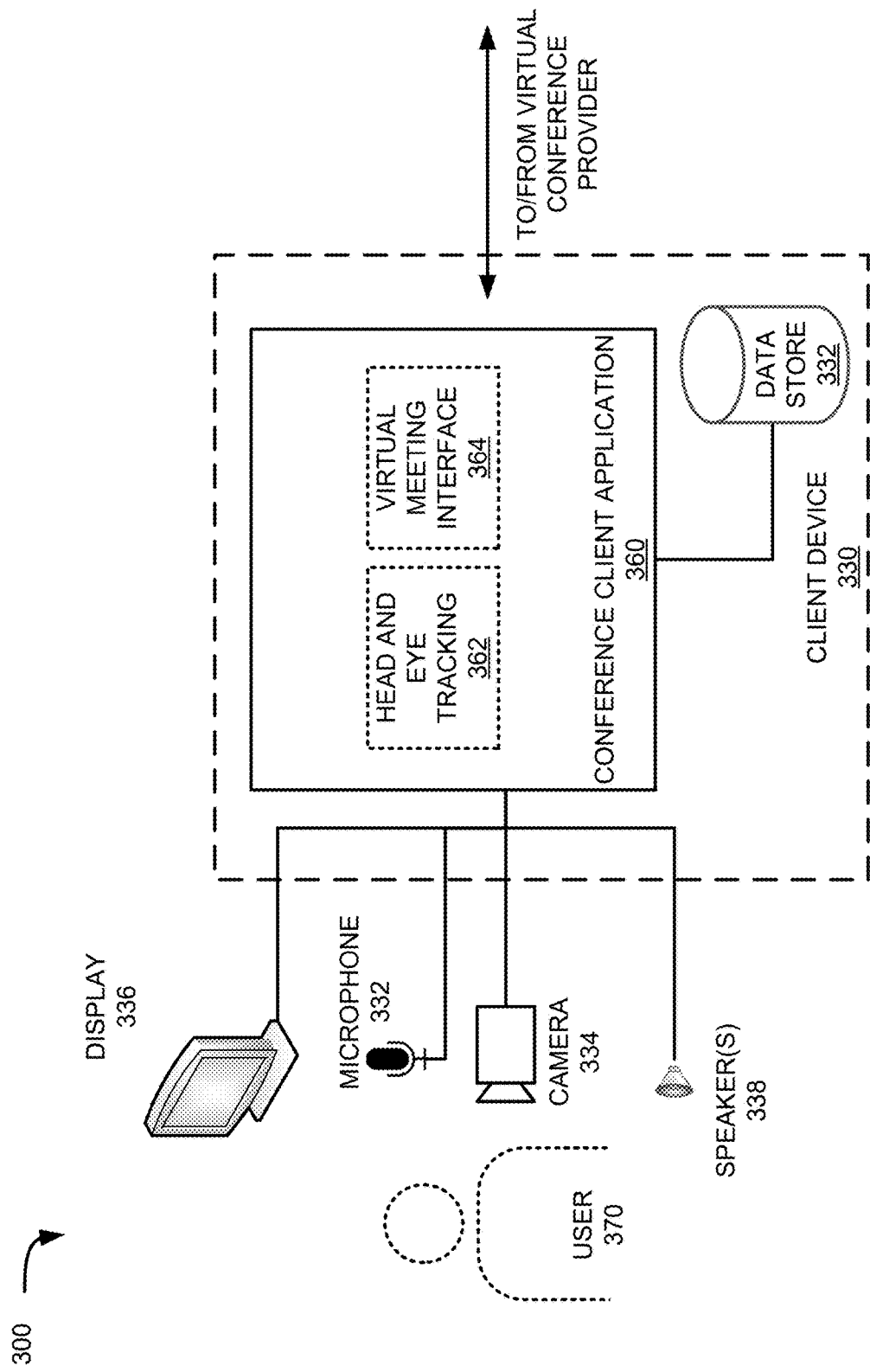
FIG. 3 shows an example system for head and eye tracking in a virtual meeting.

Referring now to FIG. 3, FIG. 3 shows an example system 300 for audio focus in a virtual meeting based on head and eye tracking. FIG. 3 shows a client device 330 that executes a virtual conference or meeting client application 360 (or "client application"). The client application 360 provides functionality 362 to track the position, movement, and focus of the head and eye of the user 370 participating and interacting in virtual conferences 364, as discussed above with respect to FIGS. 1 and 2. In addition, the client application 360 may allow other functionality, such as text chat functionality, conference scheduling, person-to-person voice chats (similar to a conventional telephone call), or any other suitable functionality.

To enable virtual conferencing functionality, the client application 360 interacts with various input and output devices, such as a microphone 332 and camera 334, and display 336 and speaker(s) 338. The client application 360 can control the microphone 332 and camera 334 to capture audio and video streams to send to the virtual conference provider, the display 336 to present a graphical user interface ("GUI") for the user 370 to interact with, which may include video output from received video streams, and the speaker(s) 338 to output received audio streams.

Figure 4:
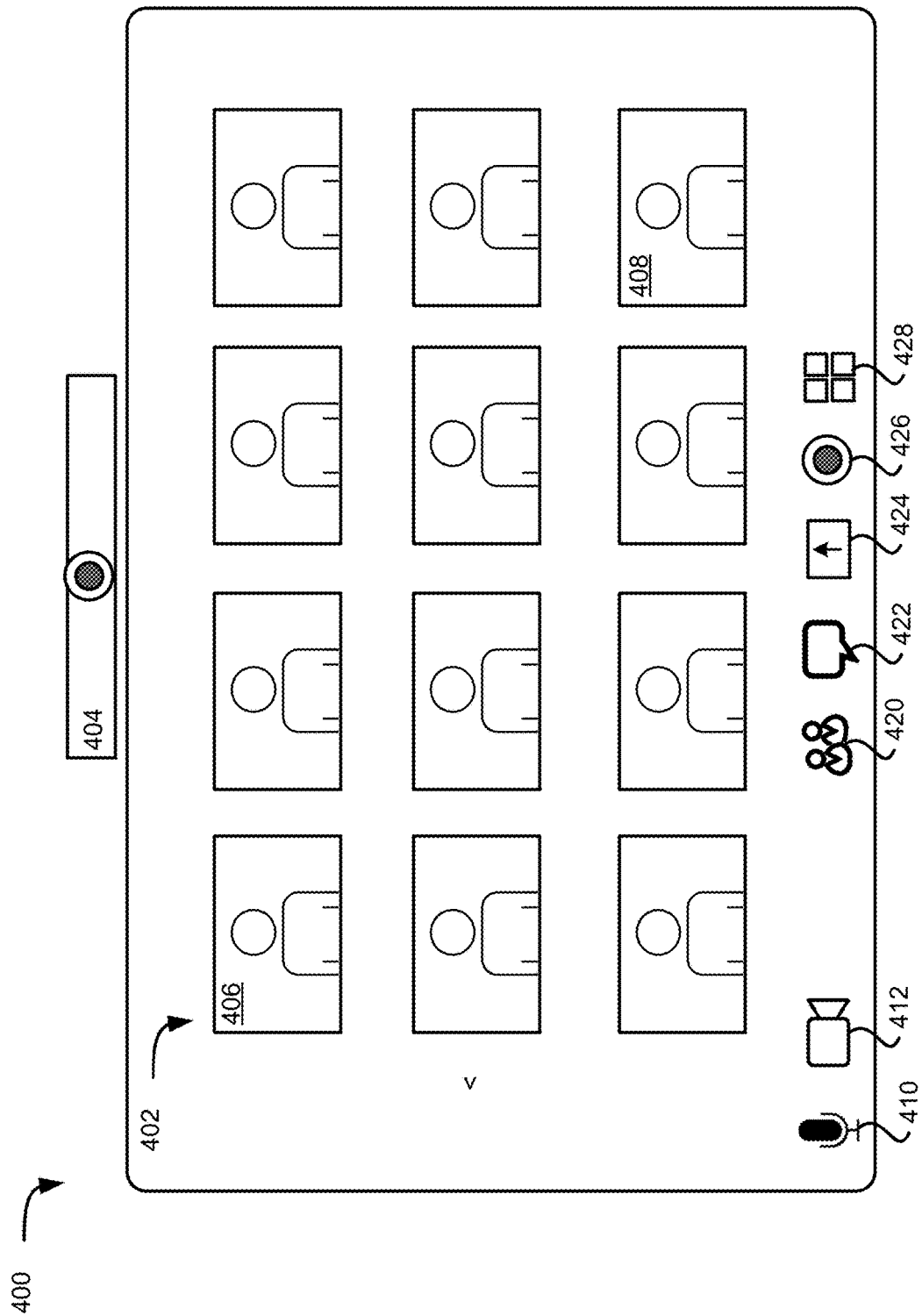
FIGS. 4 and 5 show example graphical user interfaces (GUI's) for head and eye tracking in a virtual meeting.

Referring now to FIG. 4, FIG. 4 illustrates an example GUI 400 for a client application that can provide head and eye during virtual conferences. A client device, e.g., client device 330 or client devices 340a-n, executes a client application as discussed above, which in turn displays the GUI 400 on the client device's display. In this example, the GUI 400 includes a participant view window 402 that presents a grid of the participants in the virtual meeting. Above the display is mounted a camera 404, which is able to track the location of the user's head and eyes.

The participant windows 402, also includes controls ("<" and ">") to let the user scroll to view other participants in the virtual meeting. Beneath the participant view window 402 are a number of interactive elements 410-430 to allow the participant to interact with the virtual conference software. Controls 410-412 may allow the participant to toggle on or off audio or video streams captured by a microphone or camera connected to the client device. Control 420 allows the participant to view any other participants in the virtual conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room.

The participants in the participant view window include participants 406 at the top left of the participant view window 402 and participant 408 at the bottom right of the participant view window 402. Each participant is associated with an audio and video stream or a combined audio-video stream. Either or both of these participants 406, 408 may be speaking at any one time, although it is typical that only one would be speaking. However, even if only one is speaking, ambient sound may be present in the audio stream of the non-speaking participant.

As the user views the participant view window, the camera 404 tracks the user's head and eye location. For example, the user might focus on participant 406. When the user does so, the volume of the audio stream associated with participant 406 can be increased. In this way, the user is better able to hear what the participant on whom the user is focusing is saying. In another example, the user may turn their head towards the left side of the display. And in response, the client application may increase the volume of the audio stream associated with participant 406.

Figure 5:
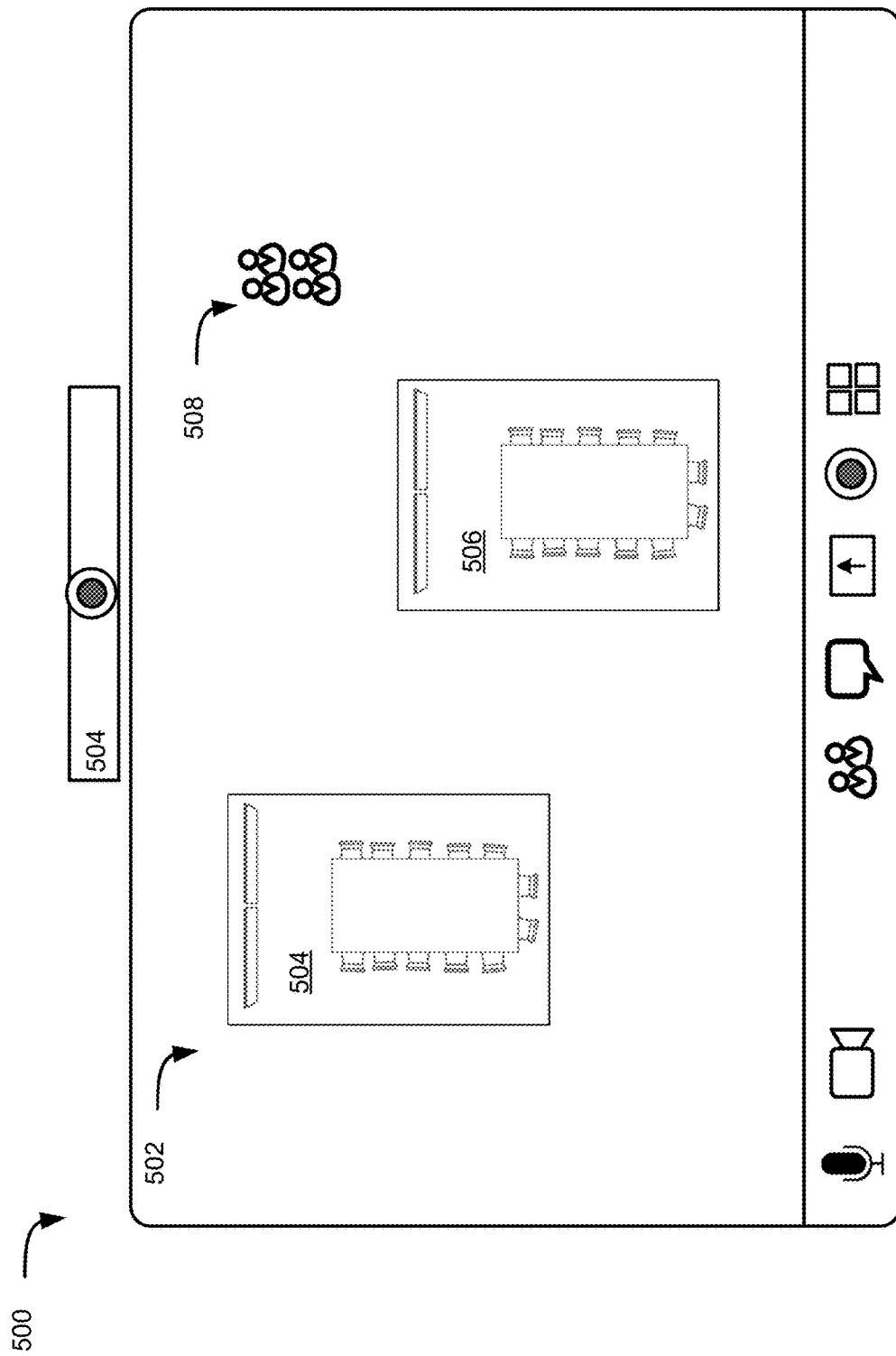

Referring now to FIG. 5, FIG. 5 illustrates an example GUI 500 for a client application that can provide head and eye during virtual conferences. A client device, e.g., client device 330 or client devices 340a-n, executes a client application as discussed above, which in turn displays the GUI 500 on the client device's display. In this example, the GUI 500 includes a participant view window 502 that presents participants in the virtual meeting who are participating in various groups. In this example, two groups of users are seated at conference tables 504 and 506. Another groups of participants 508 are congregated at the top right of the screen. Such a GUI might be useful in the case of a hybrid conference where some participants are in-person and others are participating virtually via the client application. Above the display is mounted a camera 504, which is able to track the location of the user's head and eyes.

As the user views the participant view window 502, the camera 504 tracks the user's gaze. For example, the user might focus on the group of participants at the conference table 504. For instance, the user might focus on something within the display area around the conference table 504, such as the table or a chair or may focus on a particular participant in the group. In one example system, the participant view window 502 is divided into a plurality of tiles (not shown) that can be used to track the user's gaze, i.e., the focus is determined to be associated with one of the plurality of tiles. When the user focusses on a particular display area, the client application identifies the audio stream or audio streams that are associated with the display area. Once the client application has identified the audio stream or streams, the client application can increase the volume of the audio stream or streams associated with the group or display area around the conference table 504. In this way, the user is better able to hear what the participant on whom the user is focusing is saying.

In some examples, the client applications on each of multiple participant's client devices are performing head and eye tracking. In one such example, if a first client application of a first user determines that the first user is focused on a second user participating in the virtual meeting. The volume of the first user may be increased on the second user's client device to indicate the first user's focus on the second user.

In a group meeting such as the one shown in FIG. 5, ambient noise is more likely to be present. In one example system, all of the audio streams associated with the virtual conference other than the audio stream or streams associated with conference table 504 may be decreased or even muted to ensure that the user is able to hear and participate with the group at conference table 504.

Figure 6A:
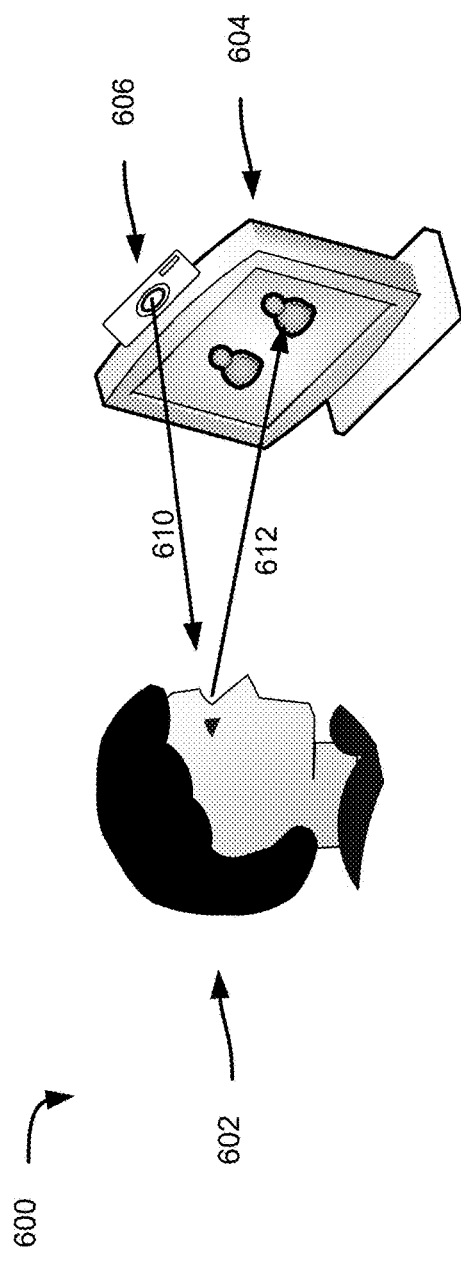
FIGS. 6A-6B show an example graphical user interface for audio focus in a virtual meeting based on eye and head tracking.
Figure 6B:
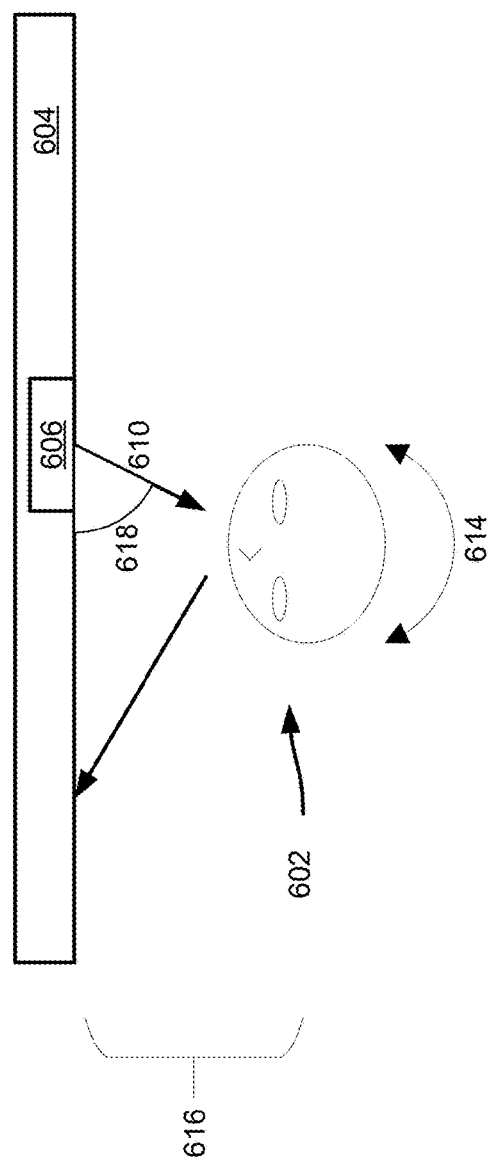

Referring not to FIGS. 6A and 6B, FIG. 6A shows an example system 600 in which a user 602 is looking at a plurality of participants of a virtual conference displayed on a display 604. A camera 606 mounted on the display 604 tracks movements of the user's head and eyes along line 610. Based on this tracking, the client application is able to determine the focus of the user's eyes, depicted by line 612.

FIG. 6B is a top view of the example system 600. FIG. 6B depicts that the user's head can rotate along an arc 614. Using the camera 606, the client application can determine the position of the user's head along this arc 614 to help determine the user's focus. The user's head is also depicted as a distance 616 from the viewing surface of the display. Finally, the user's head is offset from the camera 606 and the center of the display 604 by an angle 618. Various example systems can use some or all of these measurements to determine the user's focus and vary the volume of participants or groups of participants in a virtual meeting. In some example systems, the client application can use this information to modify the image of the user 602 presented to other participants of the virtual meeting so that it appears the user is looking directly at the camera. For example, the client application may present an image of the user's face or an avatar that can be modified to appear to be looking directly into the camera even if the user 602 is not.

Figure 7:
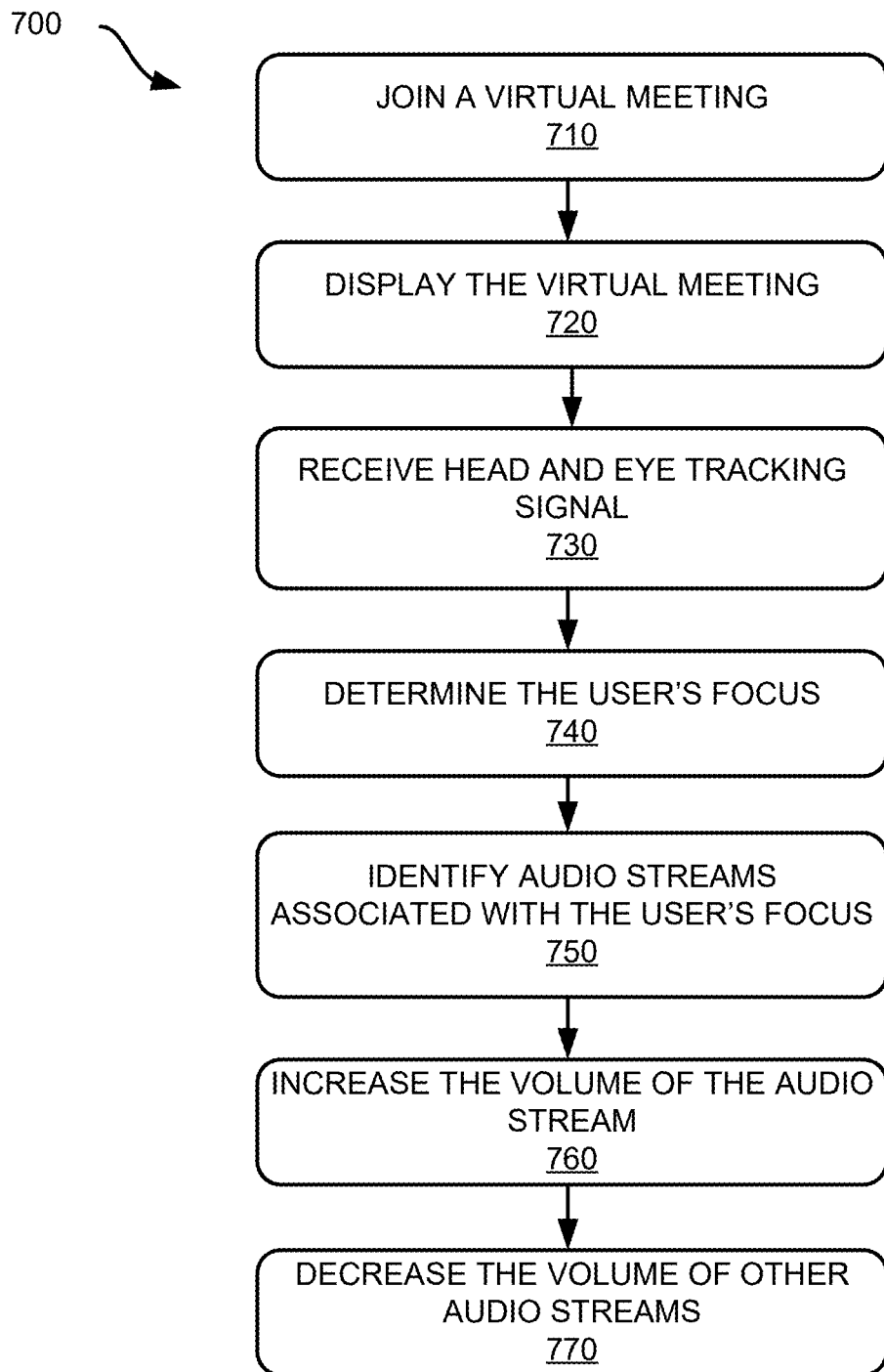
FIGS. 7-9 show example methods for audio focus in a virtual meeting based on eye tracking.

Referring now to FIG. 7, FIG. 7 shows an example method 700 for audio focus in a virtual meeting based on eye tracking. This example method 700 will be described with respect to the system 300 shown in FIG. 3; however, any suitable systems according to this disclosure may be employed in various examples.

At block 710, the client application of the user joins a virtual meeting hosted by a virtual meeting or conference provider. The virtual meeting may include two or more participants. The participants may be each participating from a separate client device, an example of which is shown in FIG. 4, or may participate in a group setting, an example of which is shown in FIG. 5, or a hybrid of both. If participants are in a group setting, for example in a conference room, then the users present in the conference room may all be joining from a single client device and generating a single audio stream associated with the client device. In other examples, the participants in the group may join from separate audio streams that are associated with each other via participation in the group and thus can be merged or treated as a single audio stream for purposes of these examples.

At block 720, the client application displays the virtual meeting. The virtual meeting may be displayed as a grid of participant windows as is shown in FIG. 4. Alternatively, the virtual meeting may be displayed as a collection of various display areas, each of which includes one or more groups of participants, as is shown in FIG. 5. Various other configurations may be displayed by example systems.

At block 730, the client application receives a head and eye tracking signal. For example, a camera may provide a signal indicating at which point on the display a user is focused. Alternatively, the camera may provide an image of the user to the client application, which then processes the image to determine the focus. In another example system, a third-party library may be used to determine focus. The signal may include information including head tracking, such as the angle and distance of the user's head, eye tracking, such as the focus of the user's eyes or the distance between the user's eyes, and additional information or a subset of such information. This information can be used to determine where on the display the user is focused. For instance, as the user's head moves, the distance between the user's eyes may change; the distance between the user's eyes can thus provide an indication of where the user is focused.

At block 740, the client application determines on the location on which the user is focused. For example, in the system shown in FIG. 4, the client application may determine that the user is focused on a particular other participant in the virtual meeting. In the system shown in FIG. 5, the client application may determine that the user's focus is on a display area, or an object within a display area. The object might be something like a conference table or a particular participant in the group. The display area may be associated with a group of users. Further the display area may be contained within one or more tiles that the client application can use to subdivide the display area.

At block 750, the client application identifies one or more audio streams associated with the virtual meeting based at least in part on the location on which the user is focused. For example, if the user is focused on a particular participant in a virtual meeting, the client application may identify a single audio stream associated with the participant. In contrast, if a user is focused on a display area that includes a group of participants, each of the participants may be associated with its own audio stream. In such a case, the client application may identify multiple audio streams that are associated with one another.

At block 760, the client application increase the volume of the output of the audio stream or streams that has been identified. The volume is increased relative to the rest of the audio streams associated with the virtual meeting. For example, if the virtual meeting is associated with ten audio streams all set to a medium volume setting, the identified audio stream may be increased to a loud volume setting.

The volume may also depend on the angle or distance of the user's head with respect to the display. For example, if the user turns towards one side of the display, i.e., the angle of the user's head in relation to a line extending perpendicular from the display surface changes, the volume associated with groups or participants and corresponding audio streams may be increased. As another example, if the user moves further away from the display, the volume may be decreased. Conversely, if the user moves closer, e.g., leans in, the volume may be increased. The amount of volume change may be made in proportion to the amount of movement of the user's head, such as in direct proportion. Alternatively, the change may be inversely proportional. For example, if the user leans back, the volume may be decreased rather than increased.

This step illustrated in block 760 may occur on multiple client applications and across client applications. For example, if a first user is focused on a second user, the volume of the first user's audio stream may be increased on the second user's client device in response. For instance, the first user may be attempting to get the attention of the second user and increasing the volume of the first user's audio stream may serve to accomplish that goal.

In some examples, the participants may be in a virtual three-dimensional space. For example, a conference table may be shown where some participants are seated near the camera and others relatively further away. In such examples, the client application can vary the volume and other characteristics of the sound, such as the balance or fade between speakers to reflect the relative positions of the participants. This information can be used in addition to information regarding the user's focus and location to vary the characteristics of the one or more audio streams associated with the participants in a virtual meeting.

At block 770, the client application identifies one or more other audio streams in the virtual meeting that are not associated with the user's focus. The client application then decreases the volume of those audio streams. These audio streams may also be associated with other display areas or groups that are not the focus of the user.

The steps in FIG. 7, particularly steps 730-770 may be repeated indefinitely during the virtual meeting. As the user's focus changes, the volume associated with various audio streams can be increased and decreased, providing a more effective and enjoyable experience to the user.

Figure 8:
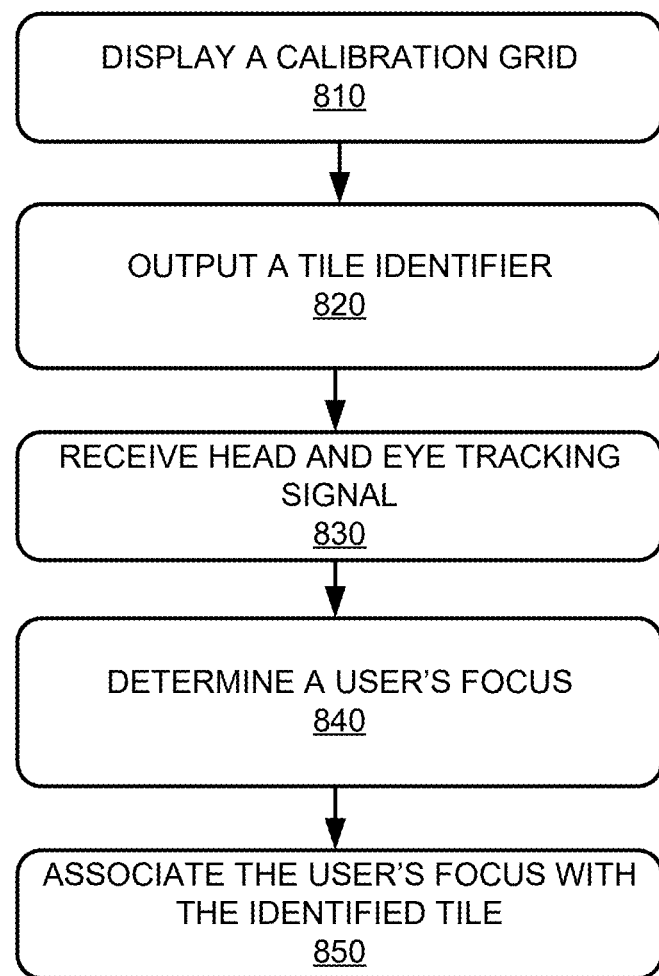

Referring now to FIG. 8, FIG. 8 shows an example method 800 for calibrating and autocorrecting head and eye tracking in a virtual meeting. This example method 800 will be described with respect to the system 300 shown in FIG. 3; however, any suitable systems according to this disclosure may be employed in various examples. Because recording may be performed by either the video conference provider or by a client device, each of the steps will be described from each computing device's perspective.

At block 810, the client application displays a calibration grid. The calibration grid may appear like the participant view in FIG. 4, wherein each participant window is a separate tile.

At block 820, the client application outputs a tile identifier. For example, the client application may instruct the user to look at the tile corresponding to participant 406 in FIG. 4.

At block 830, the client application next receives a head and eye tracking signal. For example, the camera may output a signal indicating the position of the user's eyes.

At block 840, the client application utilizes the head and eye tracking signal to determine a user's focus. For instance, the client application may determine that the user's head and eyes are in a particular location.

At block 850, the client application associates the information about the user's focus with the tile the client application identified to the user. For example, if the client application knows the user is focused on the tile associated with participant 406, the client application associates the user's focus, the information about where the user's head and eyes are located with the particular tile that contains participant 406. The client application may repeat steps 820-850 multiple times in order to calibrate the application and correctly identify the user's focus. For instance, in a second iteration, the client application may identify the tile associated with participate 408 in FIG. 4 and ask that the user focus on that tile.

Figure 9:
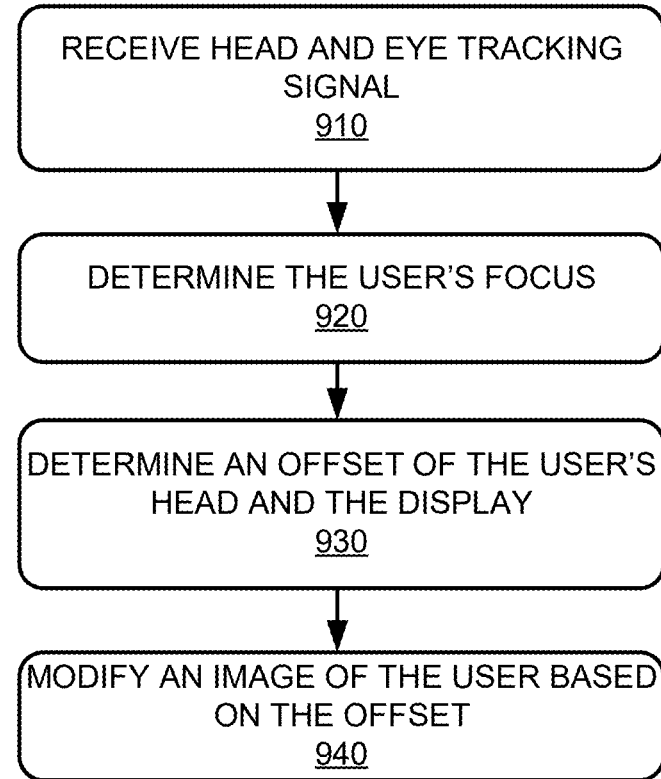

Referring now to FIG. 9, FIG. 9 shows an example method 800 for autocorrecting a view of a user in a virtual meeting. This example method 900 will be described with respect to the system 300 shown in FIG. 3; however, any suitable systems according to this disclosure may be employed in various examples. Because recording may be performed by either the video conference provider or by a client device, each of the steps will be described from each computing device's perspective.

At block 910, the client application receives one or more head and eye tracking signals. The signals may indicate, for example, that the user's head is not lined up directly in front of the camera but is instead offset as is shown in in FIG. 6B.

At block 920, the client application utilizes the head and eye tracking signal to determine the focus of the user. This is similar to the process described in relation to FIGS. 7 and 8.

At block 930, the client application determines the offset of the user's head from the center of the display. In the example shown in FIG. 6B, the user's head is offset to the left as seen from above. The client application is able to determine the distance and the angle of the user's head from the center of the camera and, depending on the configuration, the display.

At block 940, the client application uses the information to modify the image of the user based on the offset. For instance, the client application can determine based on triangulation where the user's head is located. Then the client application can use that information to rotate the image of the user's face. In some instances, the client application might use a previously stored image or images to affect the rotation. In other examples, the client application might use an avatar to represent the user during the virtual meeting.

Figure 10:
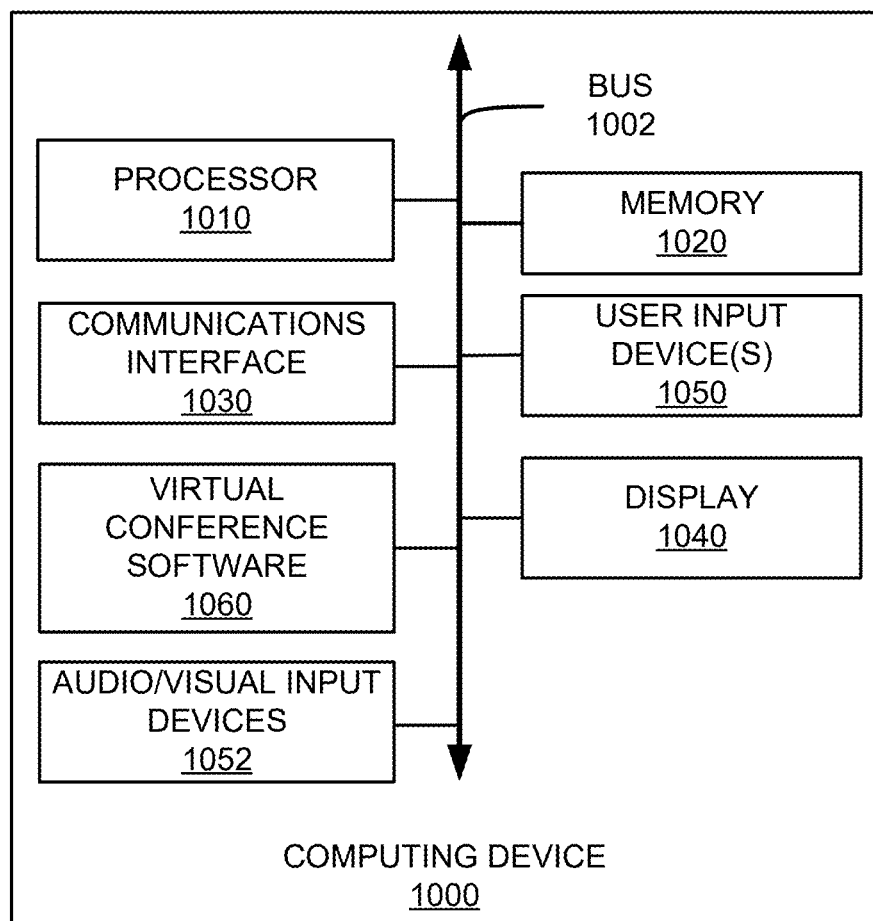
FIG. 10 shows an example computing device suitable for audio focus in a virtual meeting based on eye tracking.

Referring now to FIG. 10, FIG. 10 shows an example computing device 1000 suitable for use in example systems or methods for audio focus in a virtual meeting based on eye tracking according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for audio focus in a virtual meeting based on eye tracking according to different examples, such as part or all of the example methods 1000-1000 described above with respect to FIGS. 10-10. The computing device, in this example, also includes one or more user input devices 1050, such as a keyboard, mouse, touchscreen, microphone, etc., to accept user input. The computing device may also include one or more audio or visual input devices, such as a camera and a microphone, or one or more ports to receive audio or video feeds from an external device, such as a camera, video player, etc. The computing device 1000 also includes a display 1040 to provide visual output to a user.

In addition, the computing device 1000 also includes both video conference software 1060 and presentation content software 1070. A user of the computing device 1000 may use the video conference software 1060 to join and participate in a video conference, generally as discussed above, and to interact with virtual whiteboards.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape, or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    joining, from a client device, a virtual meeting hosted by a virtual meeting provider, the virtual meeting comprising a plurality of participants;
    displaying the virtual meeting on the display of the client device;
    receiving a head tracking signal from ahead tracking sensor, the head tracking signal associated with a first user of the client device;
    determining, based at least in part on the head tracking signal, a location and a position of the of user's head in relation to the display on which the first user is focused; and
    varying the volume of a first audio stream of a plurality of audio streams associated with the virtual meeting based at least in part on the position of the user's head.

2. The method of claim 1, wherein the position of the user's head comprises a distance from the first user's head to the display and varying the volume further comprises varying the volume based in part on the distance.

3. The method of claim 2, wherein varying the volume based in part on the distance comprises varying the volume in proportion to the distance.

4. The method of claim 1, wherein the position of the user's head comprises an angle of the user's head relative to a viewing surface of the display and varying the volume further comprises varying the volume based in part on the angle of the first user's head.

5. The method of claim 4, further comprising decreasing the volume based on the angle of the first user's head relative to a line perpendicular to the viewing surface of the display.

6. The method of claim 5, further comprising decreasing the volume in proportion to the increase in angle of the first user's head.

7. The method of claim 4, wherein determining the angle of the first user's head relative to a viewing surface of the display comprises determining the distance between the user's eyes.

8. The method of claim 7, wherein the angle of the user's head is inversely proportional to the distance between the user's eyes.

9. A system comprising:
    a non-transitory computer-readable medium;
    a communications interface; and
    one or more processors communicatively coupled to the non-transitory computer-readable medium and the communications interface, the one or more processors configured to execute processor-executable instructions stored in the non-transitory computer-readable medium to:
    join, from a client device, a virtual meeting hosted by a virtual meeting provider, the virtual meeting comprising a plurality of participants;
    display the virtual meeting on the display of the client device;
    receive a head tracking signal from ahead tracking sensor, the head tracking signal associated with a first user of the client device;
    determine, based at least in part on the head tracking signal, a location and a position of the of user's head in relation to the display on which the first user is focused; and
    vary the volume of a first audio stream of a plurality of audio streams associated with the virtual meeting based at least in part on the position of the user's head.

10. The system of claim 9, wherein the position of the user's head comprises a distance from the first user's head to the display and further comprising processor executable instructions stored in the non-transitory computer-readable medium to vary the volume further comprises varying the volume based in part on the distance.

11. The system of claim 10, wherein varying the volume based in part on the distance comprises varying the volume in proportion to the distance.

12. The system of claim 10, wherein the position of the user's head comprises an angle of the user's head relative to a viewing surface of the display and further comprising processor-executable instructions stored in the non-transitory computer-readable medium to vary the volume further comprises varying the volume based in part on the angle of the first user's head.

13. The system of claim 12, further comprising processor-executable instructions stored in the non-transitory computer-readable medium to decrease the volume based on the angle of the first user's head relative to a line perpendicular to the viewing surface of the display.

14. The system of claim 13, further comprising processor-executable instructions stored in the non-transitory computer-readable medium to decrease the volume in proportion to the increase in angle of the first user's head.

15. The system of claim 12, wherein determining the angle of the first user's head relative to a viewing surface of the display comprises determining the distance between the user's eyes.

16. The system of claim 15, wherein the angle of the user's head is inversely proportional to the distance between the user's eyes.

17. A non-transitory computer-readable medium comprising processor-executable instructions configured to cause a processor to:

join, from a client device, a virtual meeting hosted by a virtual meeting provider, the virtual meeting comprising a plurality of participants;

display the virtual meeting on the display of the client device;

receive a head tracking signal from ahead tracking sensor, the head tracking signal associated with a first user of the client device;

determine, based at least in part on the head tracking signal, a location and a position of the of user's head in relation to the display on which the first user is focused; and vary the volume of a first audio stream of a plurality of audio streams associated with the virtual meeting based at least in part on the position of the user's head.

18. The non-transitory computer-readable medium of claim 17, wherein the position of the user's head comprises an angle of the user's head relative to a viewing surface of the display and further comprising processor-executable instructions to vary the volume further comprises varying the volume based in part on the angle of the first user's head.

19. The non-transitory computer-readable medium of claim 18, further comprising processor-executable instructions to decrease the volume based on the angle of the first user's head relative to a line perpendicular to the viewing surface of the display.

20. The non-transitory computer-readable medium of claim 19, further comprising processor-executable instructions to decrease the volume in proportion to the increase in angle of the first user's head.

* * * * *